Patented Apr. 7, 1925.

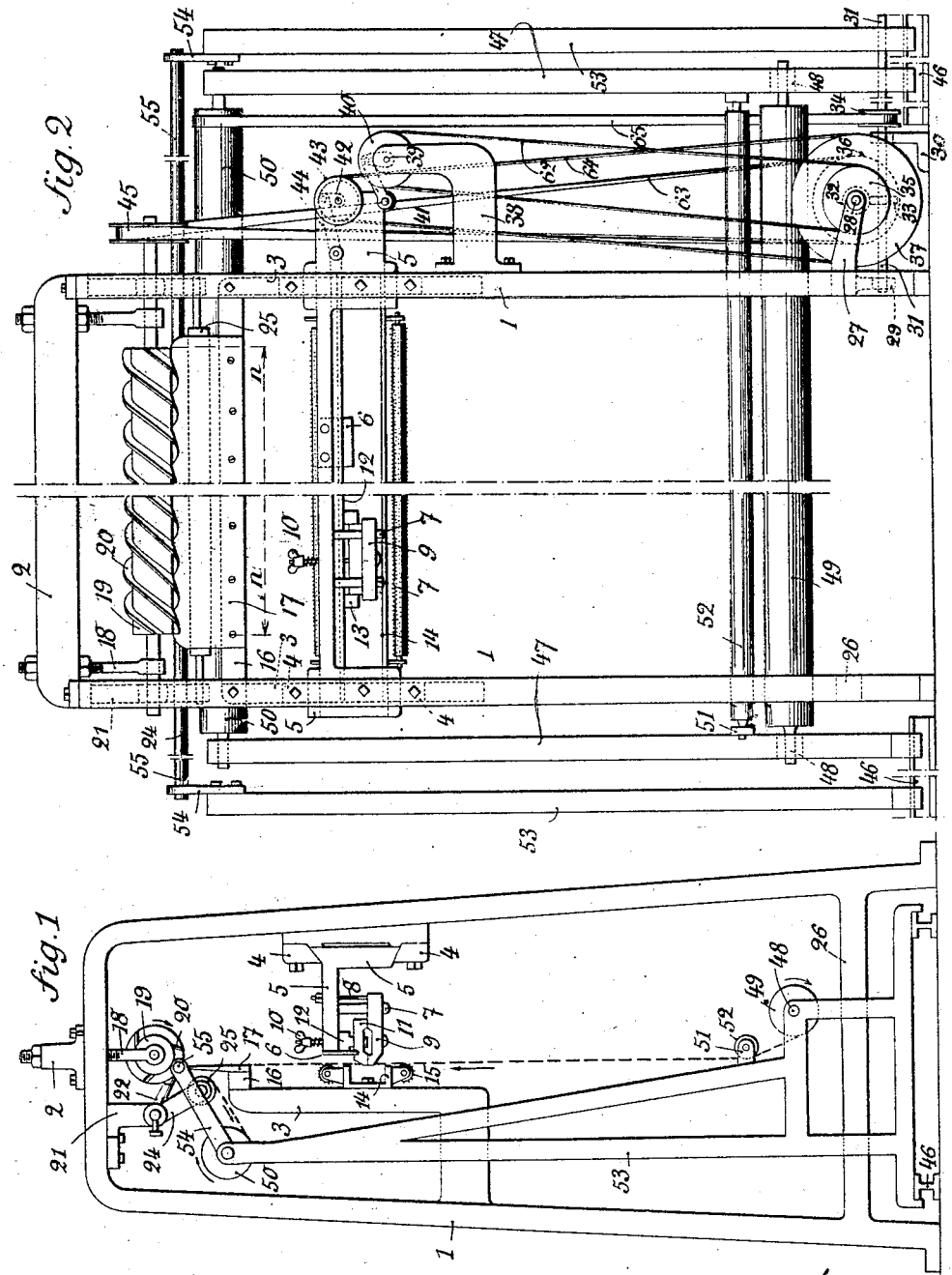

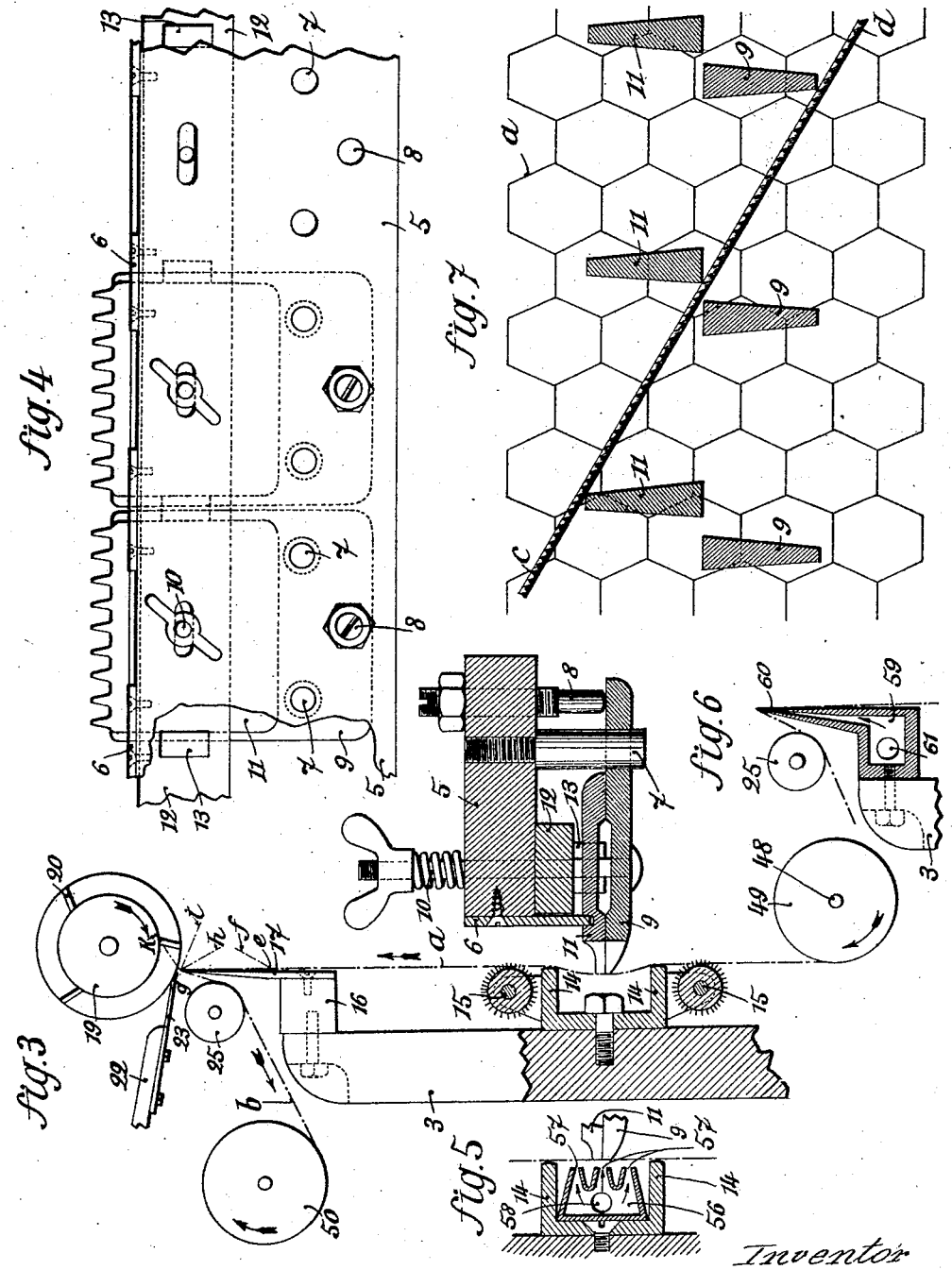

1,532,989

UNITED STATES PATENT OFFICE.

GUSTAVE CORDIER, OF CALAIS, FRANCE.

MACHINE FOR CUTTING, SHORTENING, AND SHEARING THE LOOSE THREADS OF MACHINE-MADE LACE AND ALL SIMILAR GOODS.

Application filed July 25, 1922. Serial No. 577,403.

*To all whom it may concern:*

Be it known that I, GUSTAVE CORDIER, a citizen of the Republic of France, and residing at Calais, (Pas-de-Calais Department) No. 4, Rue du Pont Lottin, in the Republic of France, engineer, have invented a certain new and useful Machine for Cutting, Shortening, and Shearing the Loose Threads of Machine-Made Lace and all Similar Goods, of which the following is a specification.

This invention relates to a machine for cutting, then shortening, and finally shearing off the loose threads of machine-made lace, webs, veils, flounces, curtains and like fabrics, even where the article is manufactured upon what is termed the "transverse system", without being obliged to divide the entire pieces into a certain number of lengthwise or transverse parts.

In carrying out the invention, I have embodied characterizing features of construction which are exceedingly important in producing a highly practical and effective arrangement of parts for severing the loose threads at their point of juncture with the fabric without damaging the latter in any way.

More specifically speaking, I have provided a machine of the class specified which embodies, among other details, a novel reciprocating cutter disposed at right angles to a guide table which is positioned directly opposite the cutter and is such in construction as to separate the loose threads from the taut ones to effect severing of the former, these parts being disposed in spaced parallelism with respect to each other and the cutting means being arranged at right angles to the path of travel of the fabric.

It is another feature of the invention in having the aforesaid guide table and cutting means relatively adjustable to each other in a longitudinal or horizontal direction to permit different stretches or bands of the fabric to be acted upon without requiring its removal from the machine.

Another feature of the invention resides in the provision of pneumatic means to be used in association with the so-called guide table and the cutting knife for facilitating separation of the loose threads from the taut ones to insure perfect results.

The accompanying drawing shows by way of example an embodiment of said invention together with various details and modified forms of construction.

Figure 1 is a side elevation of the machine constructed in accordance with this invention, the same being shown equipped with a single pair of cutting blades.

Fig. 2 is a front elevation of the machine.

Fig. 3 is an enlarged side view of the elements used for cutting and shearing.

Fig. 4 is a plan view of the cutting blades of Fig. 3, and of the mounting bar and the operating bar.

Figure 5 is a modified form, of the guide-table across which the fabric travels.

Fig. 6 is a side view of a modified form of the knife bar.

Figure 7 is an enlarged view illustrating the manner in which the cutting blades coact with one of the loose strands of the fabric in severing the intermediate portion thereof.

In the drawings, the numeral 1 indicates the two end frames of the machine proper. 2 is a bar connecting the two frames 1. 3 is a bent bracket cast with each frame 1. 4 are the guide caps which are cast with the frames 1. 5 is a carrier slidable in the guides. This carrier or member supports the following elements, which are distributed upon almost the total length thereof. 6 are guide tongues secured to the member 5; and 7 are pins also secured to 5. 8 are regulating screws with lock nut, secured to member 5. 9 are comb-shaped plates or cutting blades fitting upon the pins 7. 10 are bolts with spring and wing-nut; said bolts pass loosely through the member 5. 11 are comb-shaped opposite plates having a groove engaging below the tongues 6. 12 is a control bar comprising the blocks 13 which when disposed in the spaces between the opposite plates will serve to move the latter. 14 is a U-shaped bar or table upon whose edges the piece of work *a* is caused to bear during its downward motion. The two ends of said bar are secured to the brackets 3. The flanges of said U-shaped bar may have equal or unequal lengths. 15, 15 are loose rollers provided with studs which enter the goods *a* on the wrong side and prevent the same from making a cross movement by reason of the motion of the plates and opposite plates of the sectioning device. 16 is a cross-bar having both ends secured to the supports 3.

17 is a plate which is reduced in thickness towards the top, thus forming an almost sharp edge; this plate is secured to the bar 16. 18 indicates two supports traversing the bar 2 and whose lower part forms a bearing. 19 is a cylinder which is journalled in the bearings of the supports 18. 20 indicates plates in helical disposition on cylinder 19, and 21 supports whose lower part forms a bearing. 22 is a bar which is journalled in the members 21. A set screw prevents the bar 22 from turning in its bearings after adjustment. 23 is the knife blade of the cutter and it is secured to bar 22. 24 is an extension of supports 21; the lower part of said extension forms a bearing. 25 is a roller which is journalled in the extensions 24. 26 is a cross-piece of the frame. 27 indicates two supports which are secured to the said cross-piece 26 and whereof the end forms a bearing, and 28 is a shaft revoluble in supports 27. 29 is a support which is secured below the cross-piece 26 and whose end forms a bearing. 30 is a support disposed on the ground, the end whereof forms a bearing; 31 is a shaft turning in bearings 29, 30. 32 is a worm mounted on shaft 28; 33 is a worm wheel on shaft 31 engaging said worm; 34 is a bar actuated by shaft 31 whereupon it is longitudinally movable. 35, 36, 37 are pulleys on the shaft 28. 38 is a support secured to the frame and carrying an axle 39, and 40 is a pulley revoluble on said axle. 41 is a rod connecting the pulley 40 with the sliding member 5. 42 is an axle secured to the member 5, and 43 is a pulley revoluble thereon; 44 is a rod or link connecting the pulley 43 with bar 12. 45 is a pulley keyed to the shaft of cylinder 19. Belts 62, 63, 64, connect together the pulleys 35—40, 36—45 and 37—43. (The members 26 to 45 inclusive are not shown in Fig. 1 for the sake of clearness.) 46 are two parallel rails disposed on the ground to the right and left of the machine; 47, 47 are two frames sliding on the rails 46 and whereof the upper ends form bearings. 49 is a roller having the goods wound thereon and whereof the journals turn in the holes 48 of frames 47. 50 is a roller whereon is wound the goods $a$ after treatment and whose journals turn in holes in the upper part of frames 47. 51 indicates supports forming bearings secured to frames 47. 52 is a roller journalled in the supports 51. 53, 53 are two frames secured to rails 46; these are similar to frames 47. 54 are two supports secured to the upper part of frames 53 and whereof the ends form a bearing. 55, 55 are shafts mounted at one end in supports 54. 56 (Fig. 5) is a compressed air chamber disposed in the U-shaped bar 14. 57 are slots for outlet of compressed air; 58 is the inlet of compressed air. 59 (Fig. 6) is a hollow compressed air chamber which can be substituted for the members 16, 17 (Figs. 1 and 3). 60 is a slot for outlet of compressed air; 61 is the inlet for compressed air.

*Operation.*—The entire piece of fabric $a$ is in the first place wound on roller 49 at a point below the cutting device, the other end of the fabric $b$ being in turn secured to roller 50 and passing under roller 25, across the top edge of blade 17 and between the cutting elements or blades 9 and 11 and the table 14. The blade 17 does not extend outwardly beyond the frames 1 of the machine frame. Hence, portions of the fabric are supported by bars 55 which are situated at about the same height as the top edge of blade 17. The machine is then actuated by shaft 28, which is driven by a suitable motor. The goods are drawn by the rotation of the roller 50 and pass between the cutting elements 9, 11 and the co-acting support 14. The set of blades will cut off and shorten the loose yarn such as $c\ d$ (Fig. 7) by reason of the alternating movement to right and left which is obtained as follows. The motion of the blades is obtained by pulley 32 driving the pulley 40 by the belt 62; the pulley 40 drives the rod 41 which gives to bar 5 carrying the blades 9 a reciprocating motion of suitable extent. The movement of the opposite blades is obtained by the pulley 37 which drives pulley 43 by means of the belt 64; the pulley 43 drives the rod 44 which gives to bar 12 whereof the blocks or tappets 13 drive the counter-blades 11, a rapid reciprocating motion of proper extent.

The goods, whose loose threads are now cut and shortened, is brought before the blade 17 and then upon the top edge thereof. The parts $e\ f$ of the loose threads (Fig. 3) whose attaching point is directed rearwardly in the sense of the upward motion of the goods, are successively shortened by the cutting device and are finally severed by the same when their attaching point comes upon the top edge of blade 17.

The portions of the loose threads $g\ h$, whose attaching point is directed forwardly in the sense of motion of the goods, will rise vertically, and at the exact moment when their attaching point $g$ comes upon the top edge of blade 17, these portions of the loose threads will suddenly pivot upon the edge of said blade, taking successively the positions $g\ i\ g\ k$. In the latter position they are taken up by the helical blades 20 and sheared or pared off at a single stroke by the blade 23. The goods then passes to the rear of blade 17 and upon the roller 25 and is finally wound on roller 50, whose rotation is produced by a belt 65 and pulley 34, the latter being driven by the shaft 28 by means of the worm gearing 32, 33.

When the piece of goods has passed over the edge of the blade 17 from end to end, a band or stretch of the goods having the width n—n of the cutting and paring devices of the machine will now have been entirely treated. The machine is then stopped, and the following operations are performed, these serving to change the position of the goods with respect to the machine itself, so that a fresh band or stretch of the goods can be treated.

The shearing or paring device 22, 23 is somewhat removed from the edge of the supporting blade 17, and then one slightly moves or slides the bearing element 14 situated opposite the cutting device 9, 11, and the goods are unwound from roller 50 on to the roller 49. The goods being thus rolled again on roller 49, one moves, to the right or left, the device sliding on the rails 46 care being taken to move the same so that a fresh band of the goods comes before the machine for treatment. The elements which were first displaced are now returned into normal position and the machine is started again.

These operations can be repeated as often as required, in order to treat the goods upon the whole width which is to be operated upon. The same machine can be used for cutting and also for shearing or as a cutting machine without shearing, as well as for shearing without cutting. It can be used for goods whose width is smaller than the net width of the machine.

It is obvious that the said details of construction are given solely by way of example, and that without departing from the principle of the invention, they may be replaced by like devices serving the same purpose. In particular:

The so-called table or support for the goods which is mounted opposite the cutting device may comprise a compressed air receptacle (Fig. 5) having one or more slots for the discharge of one or more sheets of compressed air which will facilitate the separation between the loose threads and the main work during the process of the cutting.

The cutter blades and opposite blades may be of all sizes and shapes; their teeth may have any suitable size, shape and direction, and said teeth may be spaced apart as desired. The machine can be modified so as to employ two or more pairs of blades and supports.

The supporting plate or knife for cutting the goods opposite the revoluble shearing device can be replaced by a compressed air receptacle 59 (Fig. 6) whose rear face ends near the top in an almost sharp angle and is separated from the front face by a slot 60 for the discharge of a sheet of compressed air which also facilitates the separation between the free ends of the cut loose threads and the main body of the work. Any suitable shape can be given to said slot in the compressed air box, and the latter may comprise other slots below the first, or even a series of holes.

In the form here shown, the machine proper is fixed while the roller device for winding the goods is movable; but on the contrary the machine might be movable and the roller device will then be fixed. The latter arrangement has the advantage of much reducing the total length of the machine.

Claims:

1. In a machine for cutting the loose threads or yarn of a fabric, comprising comb-like blades, sliding the one against the other and means for guiding the fabric near the teeth of said blades, the combination of two toothed blades whose teeth are terminated by plane faces which are perpendicular to the plane of contact of the said blades the one against the other for preventing the teeth from engaging the meshes of the web.

2. In a machine for cutting the loose threads or yarn of a fabric comprising comb-like blades sliding the one against the other and means for guiding the fabric near the teeth of said blades, the combination of two toothed blades the teeth of which are terminated by plane faces which are perpendicular to the plane of contact of the said blades the one against the other, the guiding means being so adapted as to cause the fabric to pass close to the said plane faces of the teeth and parallel to these faces.

In testimony that I claim the foregoing as my invention, I have signed my name.

GUSTAVE CORDIER.